Figure 1:
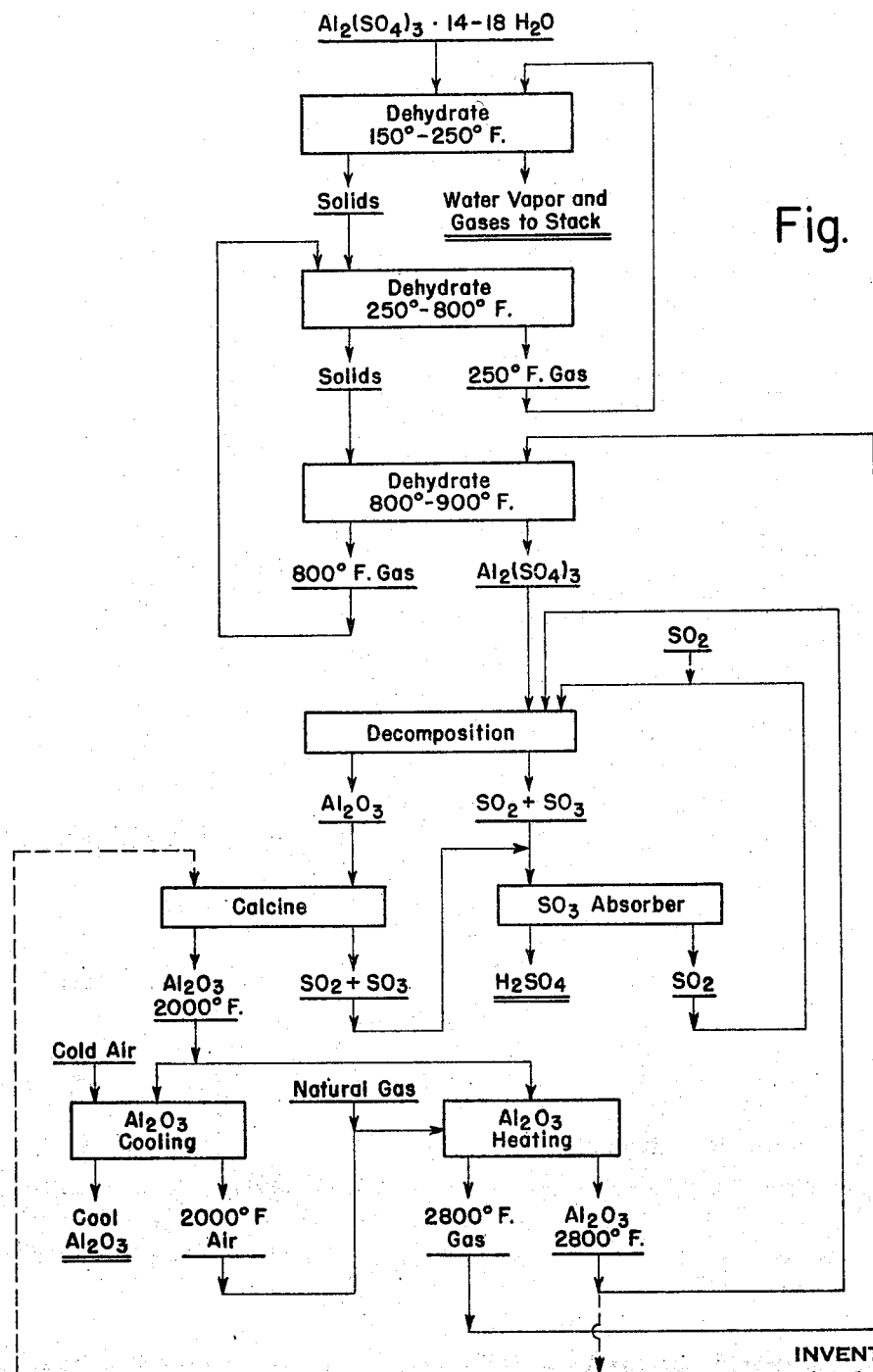

Aug. 9, 1966

J. C. UDD 3,265,464

PROCESS FOR PRODUCING METAL OXIDES BY
DECOMPOSITION OF METAL SULFATES

Filed Sept. 10, 1962

2 Sheets-Sheet 1

INVENTOR
John C. Udd

BY
Charles J. Elderkin
ATTORNEY

United States Patent Office 3,265,464
Patented August 9, 1966

3,265,464
PROCESS FOR PRODUCING METAL OXIDES BY DECOMPOSITION OF METAL SULFATES
John C. Udd, Montreal, Quebec, Canada, assignor, by mesne assignments, to The North American Coal Corporation, a corporation of Ohio
Filed Sept. 10, 1962, Ser. No. 222,485
4 Claims. (Cl. 23—142)

This invention relates generally to heat transfer, and more particularly to the provision of process steps and apparatus for the heat transfer involved in dehydration and decomposition of hydrated metallic sulfates. The invention finds particular application in the processing of hydrated aluminum sulfate for the production of cell-grade alumina which is amenable in all respects for use in the conventional Hall-process reduction to metallic aluminum, or in other processes where such material is required.

In recent years, investigators have finally achieved the long-sought goal of utilizing domestic, low-grade sources of alumina such as clays, shales and coal mine waste for the production of high-purity aluminum sulfate, which can be thermally decomposed to produce alumina. Those low-cost domestic materials are unsuited to alumina production by the conventional Bayer process because of high silica content, which increases caustic consumption and, hence, cost. While investigators have worked for over fifty years to find an economic acid extraction process in which silica content would be of no concern, it is only recently that such processes have been developed in which the capital and treatment costs have been sufficiently low, and the product has been of sufficient purity.

While the production of low-cost, high-purity aluminum sulfate clears away the major technological barrier which has heretofore prevented the use of domestic clays, shales, high-iron bauxites and like materials for alumina production, it is still necessary to decompose the sulfate in a practical and economic manner. The problem is complicated by the fact that the product of the acid extraction process is generally in the form of finely-divided crystals having from 14 to 18 moles of water of crystallization bonded thereto. It is consequently necessary to dehydrate the crystals as well as decompose them, and it is to the practical, efficient and economic carrying out of these two steps that the present invention is addressed.

As is obvious to anyone skilled in the chemical arts, the dehydration and thermal decomposition of solid materials is essentially a heat transfer problem. Other factors being equal, the process which utilizes thermal energy most efficiently will be the one which is commercially most successful. Other factors are, of course, important: a successful process must be capable of treating a large volume of material with relatively low capital cost, it must preserve the purity of the reactants and products, it should utilize conventional processing equipment, and, in addition to conserving thermal energy, it must conserve materials.

It is an object of this invention to provide both the process and apparatus for accomplishing all of the foregoing goals. Various other objects and advantages will appear from the following description of several embodiments of the invention, and the novel features will be particularly pointed out hereinafter in connection with the appended claims. While the process of the invention has particular applicability to dehydration and decomposition of aluminum sulfate, it is equally applicable to other metallic sulfates, and the use of aluminum sulfate for illustrative purposes should not be construed as limiting the scope of the invention.

Briefly, the present invention is based on the theory that the greatest conservation of thermal energy will result if reactants and heat-transfer media are moved in countercurrent relation throughout the process, and at each stage the temperature gradient between reactants and heat transfer media is minimized. Thus, where reactants are solid particles and the transfer media is a gas, the raw gas is introduced at the final stage of the process where it is greatly heated, and then moves in successive stages, countercurrent to the solids, until it gives its last sensible heat to the raw material in the first stage of the process and is exhausted. The foregoing will be readily understood in its application to dehydration and decomposition of aluminum sulfate. The product of the process, alumina, is cooled with cold air, which in turn heats this air to a temperature approaching 2000° F. This hot air is mixed with natural gas and used to heat a portion of the alumina product which is used as the heat transfer medium in the decomposition; at this stage the air, now a combustion gas, is very hot. It then goes, in successive stages, to the final dehydration stage, the intermediate dehydration stage; and finally, the initial dehydration stage. In so doing, it gives up essentially all of its sensible heat and is discharged as essentially a "cold" gas containing mostly water vapor. As the final product of the process is a cold alumina and the spent transfer medium is also cold, it will be seen that conservation of thermal energy is very great.

Figure 2:
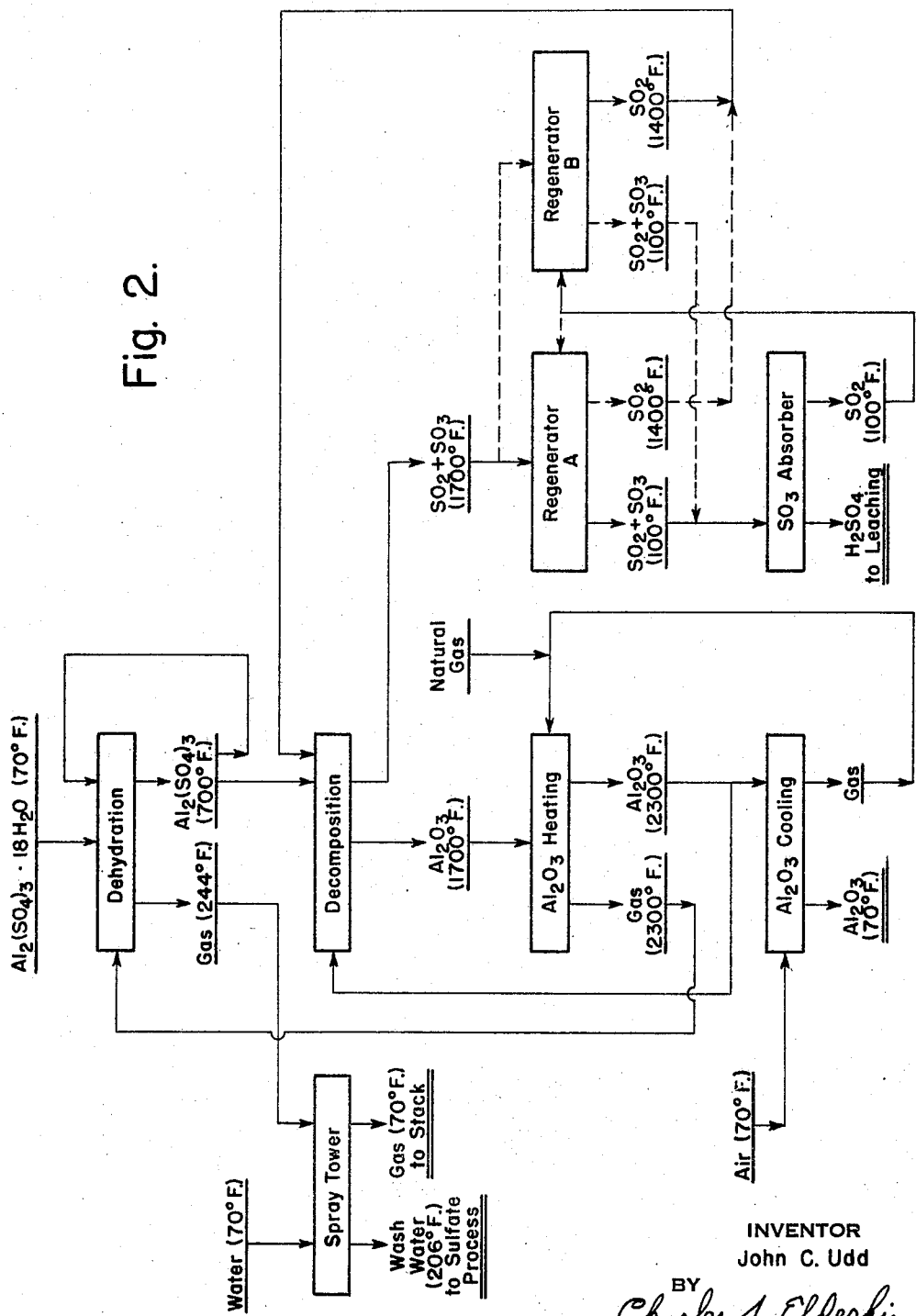

It is believed that understanding of the process steps of the invention will be facilitated by referring to the following detailed description thereof, taken in conjunction with the drawings, in which FIGURE 1 is a flow sheet or flow diagram illustrating in simplified form the process steps of the invention; and FIGURE 2 is a flow sheet or flow diagram illustrating in simplified form an embodiment of the invention which may be advantageously used in conjunction with a process for producing the aluminum sulfate utilized in the invention by leaching with sulfuric acid.

With reference to FIGURE 1 of the drawings, hydrated aluminum sulfate of the approximate composition $Al_2(SO_4)_3 \cdot 14-18H_2O$ is fed, in the form of finely divided crystals, into the first dehydration stage where it is heated to between 150° and 250° F. by the hot gas. The gas is vented to atmosphere and the solid, which has lost a few moles of water, is conveyed to the second dehydration stage, where it is heated up to about 800° F. by hot gas. The cooled gas goes to the first dehydration stage and the 800° F. solid goes to the third dehydration stage. It should be noted that at this point the solid has about six or less moles of water. In the third dehydration stage it is heated to about 900° F. and an anhydrous aluminum sulfate is the product. The gas used in this stage goes back to the second dehydration. The hot anhydrous sulfate is then mixed with preheated, finely divided alumina product and fed into the decomposer, along with recycled sulfur dioxide. The alumina is at a temperature of approximately 2800° F. and it raises the temperature of the sulfate to the required level for quick decomposition (1700°–1800° F.). The decomposer products, then, are alumina and mixed sulfur oxide gases. These are separated, but as no such separation can be truly complete, the alumina may be first calcined at about 2000° F., and the additional sulfur oxide gases evolved combined with the gaseous decomposer product. Calcining should be carried out so as not to dilute the sulfur oxides with other gases. This operation also converts gamma alumina to the preferred alpha form. The combined gases, comprising sulfur dioxide and trioxide, are treated in a scrubber or other $SO_3$ absorber, resulting in production of sulfuric acid and sulfur dioxide. Prior to such treatment, however, they may be cooled in a waste-heat boiler and further cleaned in an electrostatic dust collector before being pumped in a centrifugal or Nash type pump into the absorber. The gas pump may conveniently maintain the calciner at reduced pressure of 0.1 to 0.7 atmosphere gauge pressure to provide satisfactory removal of sulfur from the alumina product. Temperature as high as 2400° F. may be required in the calciner to remove sulfur, and alumina preheated to 2800° F. may be recirculated to the calciner to attain this temperature (as shown by dotted lines in FIG. 1). The dioxide is recycled to the decomposer, where its presence helps to shift the dioxide-trioxide equilibrium towards the production of a much greater proportion of sulfur trioxide than would otherwise be the case. It is important to carry out the decomposition without any dilution of gases.

The calcined alumina, at about 2000° F., is divided in two portions and the first is cooled by contacting it with cold air. The heated air thus produced is mixed with natural gas, and the mixture is combusted in the presence of the second portion of alumina, resulting in alumina in combustion gases both at a temperature of approximately 2800° F. The hot alumina thus produced is used as the heat transfer medium in the decomposer, and the combustion gases are used to dehydrate the sulfate prior to decomposition, being fed to the third stage of dehydration, and thence to the second and first stages, as described hereinbefore.

As is obvious from the foregoing, a circulating load of alumina is created, but, of course, as long as the working capacity of the decomposition and calcining stages are appropriately adjusted to accommodate this additional load, the output of cold alumina will at all times equal the input, in terms of available alumina.

In FIG. 2 there is illustrated a modification of the process of the invention shown in FIG. 1 which, while retaining the important features of FIG. 1, also includes several modifications thereof which make this embodiment particularly suited for use "in line" with an acid leaching process for the manufacture of aluminum sulfate. The embodiment shown in FIG. 2 also contains certain refinements, described hereinafter, which may be advantageously incorporated in any process employing the invention. It is to be noted that the heat balance table set forth hereinbelow in connection with Example I is based on this embodiment.

With reference to FIG. 2, it will be seen that the dehydration is here carried out in a single stage, with the result that the gases issuing therefrom will contain a substantial amount of heat. This heat may be utilized by conveying the gas to a spray tower wherein water is heated to a temperature sufficiently high to make it usable for washing the silica residue product of the acid leaching process. In some instances it may also be desirable to use this water for other purposes in the aluminum sulfate extraction.

The decomposition, alumina heating and alumina cooling steps are carried out in substantially the same manner as described hereinabove in connection with FIGURE 1. It will be noted, of course, that the highly heated gas is recycled directly to the single dehydration stage, rather than a later stage.

The sulfur oxide products of the decomposition stage (mixed dioxide and trioxide) are treated in a manner which takes advantage of their contained heat, and it will generally be advantageous to treat these gases in the following manner in any installation employing the invention. As shown in FIG. 2, two intermittent-gas flow, stationary-element heat regenerators are employed, and are designated A and B. As will become obvious from the following description of the operation thereof, one regenerator is always being heated while the other is being cooled. In FIG. 2, the solid lines illustrate the process when Regenerator A is being treated and Regenerator B is being cooled, and the dotted lines illustrate the opposite situation. Thus, regenerator A is heated by the mixed sulfur oxide gases from the decomposer, which are in turn cooled in passing therethrough from about 1700° to about 100° F. The cooled, mixed gases are then fed into a sulfur trioxide absorber where sulfuric acid is produced and sulfur dioxide passes through. It is to be noted that while the $SO_2$ is shown issuing from the absorber at 100° F., its temperature will most likely be higher due to the heat of $H_2SO_4$ formation. The sulfur dioxide is then fed to regenerator B, previously heated to a temperature approaching the 1700° F. temperature of the mixed gases. Here the dioxide is heated to around 1400° F. prior to recycling to the decomposer. As should be obvious, the feed gas is periodically switched from regenerator A to regenerator B; the gases are then cooled in B, sent to the absorber, the non-absorbed dioxide is heated in regenerator A and recycled to the decomposer. In the foregoing manner, a cool sulfuric acid is produced and is re-used in the acid leaching process. The sulfur dioxide is recycled at an elevated temperature to the decomposer, thus conserving heat. Frequency of switching is, of course, dependent upon the quantity of gas being treated, its exact temperature, and the size of the regenerators, and is readily calculable by one skilled in the art.

One further difference between the embodiments of FIGURES 1 and 2 is worthy of mention. It will be noted that in FIG. 1 the alumina product of the decomposition is passed to a separate calcining stage prior to being divided into two portions for heating and cooling operations. In the embodiment shown in FIGURE 2, the calcining and heating stages are combined so that all of the decomposition product is passed thereinto, and the separate portions are not divided out until all of the alumina has been so treated.

The foregoing descriptions have been limited for illustrative purposes to the dehydration of aluminum sulfate, but it will be appreciated that the process measures of the invention have equal applicability to the treatment of other metallic sulfates, such as iron sulfate, titanium sulfate, etc. It is to be emphasized that while treatment of particular sulfates may require slight modifications of the process steps to suit the raw material involved, such as, for example, those detailed in Examples II and III below, the invention is to be limited only by the scope of the appended claims; the modifications are directed solely toward the end of making the most efficient use of available thermal energy in each particular case.

While the foregoing discloses the process steps to be carried out in practicing my invention, it has but little value unless the bare process is coupled with suitable apparatus in which the process can be practically and economically carired out. Application of the systems concept for determination of the best metallurgical reactor for a given situation—that is, consideration of all inputs and outputs, including materials, money, and human effort for a plant of given capacity—has led to the formulation of a preferred embodiment for actually putting the hereinabove described process into operation. The discussion of such an embodiment below, however, is not to be considered as limiting the scope of the invention but rather only as illustrative of one method which, for a plant of certain capacity, is a feasible and economic method.

While the countercurrent flow of liquids and solids, fundamental to the maximum conservation of thermal energy in the process steps set forth above, might well lead one skilled in the art to immediately consider employment of fluidized beds as the best metallurgical reactor in which most stages of the process could be properly carried out, consideration of the characteristics of the material being treated lead to a different conclusion. While it is not to be implied that fluidized beds could not be used successfully in operation of the process, it is felt that the changes in weight and handling properties of the sulfate, through the various stages of dehydration, and the different handling properties of the alumina itself, would require maintenance of several separate reactors, each with its own fluid-dynamic operating characteristics, and this would create a need for constant human supervision at each stage which would be uneconomic except in very large installations. Also in the early stages of dehydration, a tendency to form a sticky mass has been observed and this, of course, is very detrimental to maintaining fluidizing conditions.

On the hypothesis that the highest production rate at the lowest capital cost will be achieved in a plant which has a relatively small volume of material in process at any given moment but which operates at a very high speed, and in view of the potential handling problems of the sulfate in various stages of dehydration, it was felt that concurrent flow reactors arranged in a countercurrent manner would provide the best solution, and this was found to be the fact. As noted hereinafter, however, there are certain instances when fluidized beds and other reactors are preferred.

The particular reactor selected was the cyclone, a device well known to those skilled in the metallurgical art. The use of cyclones at high temperatures is also known, and it remained only to select suitable linings and insulating materials and apply these to the instant process. The cyclone has the advantage of working at a very high gas velocity, and of keeping solids and gases in cocurrent relation.

The cyclone acts as its own dust collector in each unit process step thus avoiding an extra piece of dust collecting apparatus needed if, for example, fluidized bed reactors were used instead of cyclones. Lastly, the cyclone effects, by the solids accumulated in its conical bottom, a "built-in" seal preventing escape of gases from the bottom as long as the solids are never entirely withdrawn from the cone. This is another advantage peculiar to the cyclone shape of reactor.

In the application to the embodiment of my invention shown in FIG. 1, the raw feed, for example

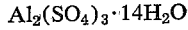

$$Al_2(SO_4)_3 \cdot 14H_2O$$

containing 9.5% $H_2SO_4$ is melted in its water at crystallization and sprayed vertically down into the first dehydration cyclone where it is picked up by a high velocity stream of gas issuing from the intermediate dehydration stage. The melted sulfate crystals lose a part of their water of hydration, become solids and settle as such in the conical bottom of the first cyclone. To insure that the sulfate particles are chilled below a temperature where they would stick together this stage of dehydration may be done at pressures under atmospheric. Alternatively, the crystals may be fed in as solids, along with recycled dehydrated crystals, and liquidation problems will thus be substantially avoided. The separated gas, now cooled, is filtered or scrubbed to remove any residual solid and exhausted to the atmosphere. The heated solid, upon discharge from the first dehydration cyclone, is picked up in a high-velocity stream of hot gas from the third stage dehydration and the gas/solid stream is fed into the intermediate dehydration cyclone. Another separation takes place, the gas goes to the first stage and the solid is picked up by the very hot combustion gases and is conveyed to the final dehydration stage. In the final dehydration stage anhydrous solids are produced as a feed for the decomposer, along with gas at approximately 800° F. As this gas may contain some $SO_3$, it is sometimes advantageous to recycle a portion of the alumina from the decomposition stage, absorb the $SO_3$ therein, and then feed the alumina (partly reconverted to sulfate) back into the decomposer (not shown in FIGURE 1). The gas, after having the $SO_3$ removed, goes to the intermediate dehydration stage, as shown in FIGURE 1.

Decomposition can also conveniently be carried out in a cyclone reactor; a high-velocity stream of sulfur dioxide, comprising both recycled and fresh gas as needed, can be used to pick up the anhydrous sulfate and the highly heated alumina. It is not necessary that all of the sulfate be decomposed in the decomposer, as any sulfate carried over will decompose in the calciner. Experiments indicate that decomposition in a cyclone runs about 90%, but that after calcining conversion is complete. Gases issuing from the decomposer and the calciner are run through an absorber or scrubber, where the $SO_3$ is absorbed into sulfuric acid directly. Alternatively, the regenerators of FIG. 2 are employed. It is noted that use of an $SO_2$ atmosphere in the reactor keeps the partial pressure thereof high, thus favoring the direct formation of the trioxide in the decomposition reaction. This allows direct absorption without contact catalysis, thereby reducing capital costs.

The cooling of the alumina product and heating of the alumina which is to be recycled can be ideally carried out in the individual cyclones at several atmospheres gauge pressure. The high efficiency of cyclone furnaces due to perfect mixing of fuel and air are well known, but the instant process introduces a novel feature which is that of instantaneously transmitting heat to solids by suspending the solids in the burning gases that whirl within the cyclone. The advantage of using cyclones wherever practical is, of course, that it is a relatively easy matter to maintain the required high-velocity gas stream, and this serves to convey the solids from one stage to the next where elevation is required. Where the next stage is lower, gravity feed from the cone-shaped bottom of a cyclone may be used. Thus, cumbersome mechanical conveyors for hot materials are entirely avoided. In the alumina cooling and alumina heating steps gas pressures of several atmospheres may conveniently be used to decrease size of cyclones and provide for system losses in velocity head due to friction and to insure that the $SO_3$ absorber may be conveniently operated at near or atmospheric pressure.

Appropriate attention must be paid, of course, to proper jacketing of all reactors and piping, so that in-process thermal losses will be held to an absolute minimum. Additionally, it is necessary to have reactor and piping linings which are abrasion-resistant, non-contaminating, and with suitable durability at the high temperatures involved. Iron-free alumina refractory materials are available which fulfill these requirements, and successful experiments have been conducted with certain spinel compositions.

It must be noted that the raw material preferred for use in the instant invention should be a commercial alum which is acid free or even slightly basic. Freshly crystallized material will invariably contain anywhere from a few percent up to 15–20% free acid, or an acid salt may be crystallized. It is standard practice to melt the washed crystals in their own water of crystallization, and add a sutiable neutralizing compound, such as alumina trihydrate, thereafter cooling and crushing the neutral product. It is this product, generally containing less than 1% free acid, which is to be preferred in operation.

In an integrated acid extraction-decomposition plant, however, it may be found advantageous to save the expense of neutralization by making certain modifications to the apparatus used in the present invention, so that an acid-wetted sulfate or even an acidic sulfate could be handled. As will be obvious to one skilled in the art of making and handling sulfuric acid, the treatment of acid-bearing or acidic salts in the present invention would result in the evolution of mixed sulfur oxide gases in the intermediate and final dehydration stages. These gases would become part of the effluent gas stream from these stages, and would be transferred ultimately to the first dehydration stage, where they would in all probability condense as a very fine mist of sulfuric acid plus sulfur dioxide. To successfully operate with such material, then, it is necessary to do two things: First, provision must be made for recovering the sulfur values, and second, acid attack of process equipment must be prevented. The latter is merely a problem of material selection, and even though it would involve a higher capital investment, it must be remembered that this is balanced against a lower operating cost due to the fact that neutralization is eliminated. The most obvious method for recovery of sulfur values, noted previously in connection with FIG. 1, is to recycle some of the alumina from the decomposer and use this to absorb the sulfur values contained in the gas streams issuing from the third and second dehydration stages. This will partly convert the alumina back to aluminum sulfate, which can be fed back to the decomposer, and the gas streams will continue as indicated in the figure. Of course, other methods for recovering these values will be obvious to those skilled in the art.

It is worthy of emphasis that the particular temperatures and ranges of temperatures set forth hereinabove are only approximate, and that the only critical temperatures are those necessary for complete dehydration (621° F.) and decomposition (1415° F.). Of course, as the process is most economic when carried out at a high rate, the higher temperatures are naturally advantageous. It should further be noted that the particular gas/solid ratio best suited for a particular installation can be readily calculated from the flow rate, heat transfer efficiency of the equipment and heat capacity characteristics of the materials. Optimum temperatures for each material at each stage can be similarly calculated.

It is believed that understanding of the invention will be further enhanced by reference to the following specific examples of particular embodiments thereof, which are illustrative only and are not intended as limiting the scope of the invention as defined in the claims appended hereto.

EXAMPLE I

The process of the invention, as set forth in FIG. 2, is used to produce approximately 700 pounds of cell-grade alumina per hour.

Dehydration is carried out in a steel cyclone tank with an acid-proof lining. Slightly acid, hydrated aluminum sulfate crystals ($Al_2(SO_4)_3 \cdot 18H_2O$) are fed into the tank at about 70° F., and dehydration occurs in the range of about 244° to 700° F. Heat is supplied by combustion gases at about 2300° F. from alumina heating stage. Feed rate of sulfate crystals is 5,357 pounds per hour, and hot gas is supplied at 5,780 pounds per hour. To prevent the acid crystals from melting in their water of crystallization, 2,428 pounds per hour of anhydrous aluminum sulfate are recirculated to the dehydration stage.

Gas exits from the top of the dehydration cyclone at a temperature of 244° F., and is fed into the bottom of the spray tower, which is a steel tower lined with lead and acid-proof brick, and containing coarse pieces of acid proof refractory. Water at about 70° F. enters the top of the tower and trickles downward over the coarse refractory materials. Wash water exiting from the bottom of the vessel is heated thereby to a temperature of 206° F. Gas exiting from the top is about 70° F. and is vented to the stack.

HEAT BALANCE—EXAMPLE I

| Process Step | Source or Disposition of Heat | Specific Heat | Initial Temp., °F. | Final Temp., °F. | Temp. Change °F. | Flow Rate, lbs./hr. | Heat Change, B.t.u./Hr. | Loss Assumed, Percent | Heat Change, B.t.u./Hr. |
|---|---|---|---|---|---|---|---|---|---|
| Spray tower | Condense $H_2O$ from combustion gases. | ht. cond. 1,000. | --- | --- | --- | 696 | 696,000 | 10 | 626,000 |
| Do | Sensible heat in combustion gas and excess air. | 0.29 | 244 | 70 | 174 | 5,780 | --- | (¹) | 292,000 |
| Do | Preheat wash water for filtration. | 1.0 | 70 | 206 | 136 | 6,730 | 918,000 | --- | 918,000 |
| Dehydration | Preheat $Al_2(SO_4)_3 \times 18 H_2O$ with combustion gas. | 0.39 | 70 | 700 | 630 | 5,357 | 1,316,000 | (¹) | dehydrate |
| Do | Recycle $Al_2(SO_4)_3$. | 0.19 ht. dehy. | 700 | 700 | 0 | 5,357 | --- | (¹) | 3,415,000 |
| Do | Dehydrate $Al_2(SO_4)_3 \times 18 H_2O$ to make $Al_2(SO_4)_3$. | 1,364 | --- | --- | --- | 2,355 | 2,099,000 | (¹) | --- |
| Decomposition | Heat $Al_2(SO_4)_3$ 700–1,400° F. | 0.19 | 700 | 1,400 | 700 | 2,428 | 323,000 | (¹) | --- |
| Do | Heat $Al_2(SO_4)_3$ and $SO_2$ 1,400–1,500° F. | 0.19 | 1,400 | 1,500 | 100 | 8,990 | 171,000 | (¹) | --- |
| Do | Decompose $Al_2(SO_4)_3$. | ht. decom. 804 | --- | --- | --- | 2,261 | 1,818,000 | (¹) | decompose 2,803,600 |
| Do | Heat decomposition products 1,500–1,700. | 0.21 | 1,500 | 1,700 | 200 | 8,990 | 378,000 | (¹) | --- |
| Do | Preheat alumina product 1,700–2,300. | 0.27 | 1,700 | 2,300 | 600 | 702 | 113,600 | (¹) | --- |
| | | | | | | | 6,218,600 | | |
| Alumina heating | Calcine alumina (exothermic). | ht. reac. +252 | --- | --- | --- | 702 | 177,000 | --- | --- |
| Alumina cooling | Recover sensible heat from alumina product. | 0.27 | 70 | 2,300 | 2,230 | 702 | 422,674 | --- | --- |
| Alumina heating | Burn natural gas with air. | 980 | --- | --- | --- | cu. ft. 6,870 | 6,733,000 | 15 | 6,230,000 |
| Do | Heat in combustion products of theoretical air calculated by cu. ft. nat. gas × 0.782 lbs./cu. ft. | 0.29 | 2,300 | 244 | 2,056 | 5,390 | 3,215,000 | --- | --- |
| Do | Heat in excess air. | 0.29 | 2,300 | 244 | 2,056 | 390 | 240,000 | --- | --- |
| Dehydration | Heat available for Vessel 2 dehydration (see "dehydrate" above). | --- | --- | --- | --- | --- | 3,455,000 | (¹) | 3,455,000 |
| Decomposition | Pounds of alumina needed for recirculation. | 0.27 | 2,300 | 1,700 | 600 | 17,500 | --- | (¹) | 2,803,600 |
| Gas regenerators | Cool $SO_2$–$SO_3$ gas. | 0.17 | 1,700 | 96 | 1,604 | 8,193 | 223,200 | 35 | from above 145,000 |
| Do | Preheat $SO_2$. | 0.17 | 1,400 | 100 | 1,300 | 6,550 | 145,000 | --- | --- |

¹ Loss of 15% heat allowed under burning of natural gas with air.

The decomposer is a steel cyclone with heavy, acid-proof refractory lining, designed for operation at 1400°–1700° F. Anhydrous aluminum sulfate from the dehydration stage is fed in at 700° F. together with alumina at 2300° F. from the alumina heating reactor. Recycled sulfur dioxide at 1400° F. is also fed into the decomposer to boost the yield of sulfur trioxide. Products of the decomposer are alumina and mixed sulfur oxide gases at 1700° F.

All alumina from the decomposer is heated in the alumina heating reactor, a steel cyclone with a heavy refractory lining. Alumina is fed to the reactor at 1700° F. along with natural gas ($CH_4$) and compressed air preheated in the alumina cooling step. A circulating load of alumina is recycled to the decomposition stage for heat transfer purposes, combustion gases go to the dehydration stage, and through-put alumina goes to the alumina cooling stage. All products exit at about 2300° F. The circulating load of alumina amounts to about one day's production, and thus does not tie up an inordinate amount of material in process.

Through-put alumina from the alumina heater is cooled in a steel tank lined with heavy refractory which in this case is a fluidized bed reactor, but which could also be a cyclone. Cool compressed air fluidized the alumina particles, reducing their temperature from 2300° to 70° F. during passage through the reactor. Heated air is used to combust the natural gas in the alumina heating stage.

Regenerators A and B are identical steel tanks lined with heavy refractory material and filled with a permeable bed of granular aluminum sulfate as a heat exchange medium. Operation is conducted in the manner set forth hereinabove with relation to FIGURE 2, resulting in production of cool sulfuric acid and $SO_2$ at 1400° F. from the original mixed oxide gases to 1700° F. The regenerators may be operated as fixed or fluidized bed heat exchangers; in the instant case fixed beds are preferred.

Use of cyclone reactors for dehydration, decomposition and alumina heating is particularly desirable, as the whirling motion of the charge results in a minimum of dust loss with the gaseous products.

It is worthy of emphasis to note that all process heat for the process is generated in the alumina heating stage, and the heat of combustion is used in the most economic manner. Consumption of gas amounts to only 6,870 cubic feet per hour. It is to be further noted that in the heat balance appended hereinabove wherein all material flow rates and heat exchanges are detailed, the heating value of the natural gas is assumed to be 980 B.t.u. per pound, which is a conservative figure in that the heat of condensation of water vapor is not considered.

EXAMPLE II

The process of the invention as described in Example I with aluminum sulfate was carried out with some slight modifications on iron (ferrous) sulfate. The only significant modification results from the fact that heated wash water is here not a desired by product, and as a consequence, the hot vapor-laden gas issuing from the dehydration stage is used to preheat air for the combustion heating of decomposed oxide. Construction of apparatus is similar to that used in Example I, except where indicated.

Ferrous sulfate monohydrate containing 7.5% free $H_2O$ is picked up by the combustion gases from the oxide heating stage (2337° F.) and blown into the dehydrator cyclone. Anhydrous ferrous sulfate at 572° F. is drawn off the bottom of the dehydrator and gravity fed into the decomposer. Recycled iron oxide ($Fe_2O_3$) at 2337° F. decomposes the anhydrous sulfate to FeO and mixed sulfur oxide gases at 1382° F. The sulfur oxide gases are treated as in Example I, the $SO_2$ being recycled to the decomposer. The decomposed FeO and the $Fe_2O_3$ heat exchange medium coming out the bottom of the decomposer cyclone are picked up by cool compressed air and conveyed to the oxide burner, being mixed therein with heated air from the dehydrator gas regenerators, the oxide cooler, and natural gas. In this case the oxide heater not only heats the FeO to a sufficient temperature for use in the decomposer but also oxidizes it to $Fe_2O_3$. This oxidation is, of course, exothermic and gives a heat credit. It is worthy of emphasis to note that only 2,615 cubic feet of natural gas ($CH_4$) are required per ton of $H_2SO_4$ recovered. Combustion gases and oxide leave the heater at 2337° F.; the gases being pumped into the dehydrator and the oxide being in part recycled to the decomposer and in part fed by gravity into the oxide cooler. The oxide cooler is a cyclone using cool compressed air.

Use of an intermittent gas flow stationary element heat regenerators to reclaim the heat in the dehydrator off-gas is more advantageous than merely recycling this gas to the oxide heater, because a circulating load of water vapor is thus avoided and use is thus made of the heat of condensation of the water vapor contained therein.

The heat regenerators employed for cooling the mixed sulfur oxide gases and preheating recycled $SO_2$ are of the same design as employed in Example I, except that in this case ferrous sulfate is conveniently used as the heat trans-

HEAT BALANCE—EXAMPLE II

| Process Step | Source or Disposition of Heat | Specific Heat | Initial Temp., °F. | Final Temp., °F. | Temp. Change, °F. | Flow Rate, lbs./hr. | Heat Change, B.t.u./Hr. ($10^6$) | Loss Assumed | Heat Change, B.t.u./Hr. ($10^6$) |
|---|---|---|---|---|---|---|---|---|---|
| Dehydration | Preheat $FeSO_4 \times H_2O$ with combustion gas. | 0.158 | 70 | 572 | 502 | 18,580 | 1.474 | | |
| Do | Dehydrate $FeSO_4 \times H_2O$ to $FeSO_4$. | 1,000/lb. | $H_2O$ | | | [1] 3,165 | 3.165 | | |
| | Total needed for dehydration. | | | | | | 4.639 | | |
| Decomposer | Heat $FeSO_4$ 572° F. to 1,382° F. | 0.158 | 572 | 1,382 | 810 | 15,170 | 1.940 | | |
| Do | Decompose $FeSO_4$. | [2] 731 | | | | 15,170 | 11.089 | | |
| | Total needed for decomp. | | | | | | 13.029 | | |
| | Total to dehydrate and decompose. | | | | | | 17.67 | | |
| Oxide heater | FeO oxidized to $Fe_2O_3$. | [2] 743 | | | | 8,040 | 5.95 | | |
| Do | Cu. ft. natural gas to develop heat. | [3] 980 | | | | | 12.52 | | |
| Regenerators, dehy. gas. | Heat recovered from comb. gas not needed to dehydrate (from below). | | | | | | 1.41 | | |
| Oxide cooler | Heat recovered from $Fe_2O_3$ product. | 0.21 | 1,382 | 70 | 1,312 | [4] 8,040 | 2.22 | | |
| | Total available heat. | | | | | | 22.10 | 20 | 17.67 |

See footnotes at end of table.

HEAT BALANCE—EXAMPLE II—Continued

| Process Step | Source or Disposition of Heat | Specific Heat | Initial Temp., °F. | Final Temp., °F. | Temp. Change, °F. | Flow Rate, lbs./hr. | Heat Change, B.t.u./Hr. (10⁶) | Loss Assumed | Heat Change, B.t.u./Hr. (10⁶) |
|---|---|---|---|---|---|---|---|---|---|
| Oxide heater | Heat in combustion gases | 0.29 | 2,337 | 252 | 2,085 | ⁵ 10,000 | 6.05 | | |
| Dehydration | Heat needed for dehydration above. | | | | | | 4.64 | | |
| Regenerators, dehy. gas. | Heat recovered from combustion gas not needed to dehydrate. | | | | | | 1.41 | | |
| Decomposes to oxide heater. | 4 lbs. Fe₂O₃ to recirculate to dehydrate. | 0.21 | 2,337 | 1,382 | 955 | 65,000 | 13.029 From above | | |
| SO₂–SO₃ regenerators. | Heat in SO₃ evolved and SO₂ recirculated. | 0.17 | 1,382 | 200 | 1,182 | ⁶ 22,810 | 4.58 | 29.5 | 3.23 |
| | Heat SO₂ in regenerator | 0.17 | 100 | 1,382 | 1,282 | ⁶ 14,830 | 3.23 | | |

NOTES:
¹ Includes 9.5% combined plus 7.5% free H₂O per ton FeSO₄×H₂O, or 38 tons H₂O/24 hours, or 3,165 lbs./hour.
² Heat of decomp.
³ B.t.u./cu. ft.×12,780 cu. ft.
⁴ 160/304×(Fe₂O₃/2FeSO₄)×15,170 or 8,040 lbs. Fe₂O₃ recovered/hour.
⁵ Lbs. combustion products estimated as 0.782×cu. ft. nat. gas above.
⁶ 80/152×(SO₃/FeSO₄)×15,170 or 7,980 lbs. SO₃ recovered/hour equivalent to 9,770 lbs. H₂SO₄/hour.
The gas from decomposer is 35% SO₃=7,980 lbs. and balance is SO₂ or 65%/35%×7,980 is 14,830 lbs. SO₂ recirculated/hour.

fer medium. Gas from the decomposer is 35% SO₃, which is absorbed at the flow rates indicated in the table above, this amounts to 7,980 pounds SO₃ recovered and 14,830 pounds SO₂ recirculated per hour.

The heat balance table appended hereinabove provides complete data on per hour throughput, temperature changes and recycle loads for a 60,000 ton per year plant.

EXAMPLE III

The process steps set forth in Example II, were repeated using titanium sulfate containing approximately 10% free water as a raw material. In carrying out the process of the invention on titanium sulfate, the desired end-product is generally pigment grade TiO₂, which must be in the form of rutile. This is best accomplished through the use of high temperatures and a large recirculating load in the calcining and decomposition stages, as set forth in the appended heat balance table. Without taking these measures, the decomposition product is a mixture of rutile and anatase. The attached heat balance table sets forth temperatures and flow rates for a plant producing 10,000 tons per year of pigment grade titania from 24,018 tons per year of titania sulfate.

HEAT BALANCE—EXAMPLE III

| Process Step | Source or Disposition of Heat | Specific Heat | Initial Temp., °F. | Final Temp., °F. | Temp. Change, °F. | Flow Rate, lbs./hr. | Heat Change, Millions B.t.u./hr. | Est. Heat Loss, Pct. | Heat Change, Millions B.t.u./hr. |
|---|---|---|---|---|---|---|---|---|---|
| Dehydration | Preheat Ti₂(SO₄)₃ to 572° F | ¹ 0.2 | 70 | 572 | 502 | 6,065 | 0.6089 | | |
| Do | Evaporate 10% moisture | ² 970 | | | | 606.5 | 0.5884 | | |
| Do | Form oxygen sulphates raise 10% moisture to 572°. | 0.48 | 100 | 572 | 472 | 606.5 | 0.1375 | | |
| Do | Total for drying | | | | | | 1.3348 | | |
| Decomposition | Heat Ti₂(SO₄)₃ to 1,382° F | ¹ 0.2 | 572 | 1,382 | 810 | 6,065 | 0.9825 | | |
| Do | Decompose Ti₂(SO₄)₃ | ¹ ³ 700 | | | | 6,065 | 4.2455 | | |
| Do | Total for decomposing | | | | | | 5.2280 | | |
| | Total heat to dry and decompose. | | | | | | 6.56 | | |
| Oxide heater | Cu. ft. nat. gas/hr. to develop heat. | ⁴ 980 | | | | ⁵ 6,065 | 5.94 | | |
| Regenerator dehy. gas. | Heat recovered from combustion gas not needed to dehydrate from below. | | | | | | 1.01 | | |
| Oxide water | Heat recovered from TiO₂ product. | 0.228 | 2,272 | 70 | 2,202 | ⁶ 2,525 | 1.27 | | |
| | | | | | | | 8.22 | 20 | 6.56 |
| Oxide Heater | Heat in combustion gases | 0.29 | 2,272 | 572 | 1,700 | ⁷ 4,740 | 2.34 | | |
| Dehydration | Heat needed for drying Ti₂(SO₄)₃ above. | | | | | | 1.33 | | |
| Regenerators dehy. gas. | Heat recovered from combustion gas not needed for drying. | | | | | | 1.01 | | |
| Decomposer to heater. | Lbs. TiO₂ recirculated to dehydrate. | 0.228 | 2,272 | 1,382 | 890 | 25,760 | 5.23 | | |
| SO₂–SO₃ Regenerators. | Heat in SO₃ evolved and SO₂ recirculated. | 0.17 | 1,382 | 200 | 1,182 | ⁸ 7,223 | 1.45 | 30 | 1.02 |
| Do | Heat SO₂ in regenerator | 0.17 | 100 | 1,382 | 1,282 | ⁸ 4,695 | 1.02 | | |

NOTES:
¹ Estimated since no data on heat of decomposition or specific heat of Ti₂(SO₄)₃ available.
² Heat of evap.
³ Heat of decomp.
⁴ B.t.u./cu. ft.
⁵ Cu. ft./hr.
⁶ TiO₂ recovered 2 TiO₂/Ti₂(SO₄)₃, 159.8/383.8×6,065 or 2,525.
⁷ Lbs. combustion products estimated as 0.782×cu. ft. nat. gas above, or 4,740.
⁸ Lbs. SO₃ evolved is 2 SO₃/Ti₂(SO₄)₃, or 160/383.8×6,065 or 2,528 lbs./hour equivalent to 98/80×2,528 or 3,096 lbs. H₂SO₄/hour. Gas from decomposer is 35% the above SO₃ and balance SO₂ or 65%/35% ×2,528 or 4,695 lbs. SO₂ recirculated per hour and total SO₂ and SO₃ from decomposer 7,223 lbs./hr.

EXAMPLE IV

The procedures under Examples II and III were repeated using nickel sulfate as a raw material and producing NiO as a product. Process equipment is the same as used in Example II. The attached heat balance sheet gives temperature and flow rate data for a plant producing 10,000 tons per year of nickel oxide from 20.711 tons per year of the corresponding sulfate.

HEAT BALANCE—EXAMPLE IV

| Process Step | Source or Disposition of Heat | A Specific Heat | B Initial Temp., °F. | C Final Temp., °F. | D Temp. Change, °F. | E Flow Rate, lbs./hr. | F Heat Change, Millions B.t.u./hr. | G Est. Heat Loss, Pct. | H Heat Change, Millions B.t.u./hr. | Line No. |
|---|---|---|---|---|---|---|---|---|---|---|
| Dehydration | Preheat NiSO₄ to 572° C | 0.225 | 70 | 572 | 500 | 5,233 | 0.5885 | | | 1 |
| Do | Evaporate 10% moisture | ¹ 970 | | | | 523 | 0.5070 | | | 2 |
| Do | Raise 10% moisture to 572° | 0.48 | 100 | 572 | 472 | 523 | 0.1185 | | | 3 |
| Do | Total for drying | | | | | | 1.2140 | | | 4 |
| Decomposition | Heat NiSO₄ to 1,382° F | 0.225 | 572 | 1,382 | 810 | 5,233 | 0.9530 | | | 5 |
| Do | Decompose NiSO₄ to NiO | ² 905 | | | | 5,233 | 4.7400 | | | 6 |
| Do | Total for decomposition | | | | | | 5.6930 | | | 7 |
| | Total for drying and decomposition | | | | | | 6.9070 | | | 8 |
| Oxide heater | Cu. Ft. Nat. gas to develop heat | ³ 980 | | | | ⁴ 6,460 | 6.33 | | | 9 |
| Regenerator dehy. gas. | Heat recovered from combustion gas not needed to dehydrate from 15° F. below. | | | | | | 1.28 | | | 10 |
| Oxide water | Heat recovered from NiO product with air. | 0.183 | 2,272 | 70 | 2,202 | ⁵ 2,525 | 1.02 | | | 11 |
| | | | | | | | 8.63 | 20 | 6.91 | 12 |
| Oxide Heater | Heat in combustion gases | 0.29 | 2,272 | 572 | 1,700 | ⁶ 5,055 | 2.490 | | | 13 |
| Dehydration | Heat needed for drying NiSO₄ above. | | | | | | 1.214 | | | 14 |
| Regenerators dehy. gas. | Heat recovered from combustion gas not needed for drying. | | | | | | 1.276 | | | 15 |
| Decomposer to heater. | Lbs. NiO recirculated to dehydrate. | 0.183 | 2,272 | 1,382 | 890 | ⁷ 29,100 | 4.74 | | | 16 |
| SO₂-SO₃ Regenerators. | Heat in SO₃ evolved and SO₂ circulated. | 0.17 | 1,382 | 200 | 1,182 | ⁸ 7,736 | 1.56 | 26 | 1.15 | 17 |
| Do | Heat SO₂ in regenerator | 0.17 | 100 | 1,382 | 1,282 | ⁸ 5,028 | 1.15 | | | 18 |

NOTES:
¹ Heat.
² Heat of decomp.
³ B.t.u./cu. ft.
⁴ Cu. ft. gas/hour determined by solving the formula of the following line and column designation in (9A)×(9E) plus (10F) plus (11A)×(11C)×(11E)=(8F)/1.0−(12G)/100 where (10F)=(13A)×(13D)×(9E)×0.782 lbs. combustion products−(4F) which resolves to 980×(9E) plus 386×(9E) equals 8.63+1.21−1.02 and (9E) equals 6,460.
⁵ NiO recovered NiO/NiSO₄ 74.69/154.69×5,233, or 2,525.
⁶ Cu. ft. nat. gas (6,460)×0.782 lbs./cu. ft. gas.
⁷ Lbs. to recirculate is heat to decompose (6F) divided by (16A)×(16D).
⁸ Lbs. SO₃ evolved is SO₃/NiSO₄ or 80/154.69×5,233 or 2,709 lbs. SO₃ equivalent to 98/80×2,708 or 3,320 lbs. or 1.66 tons H₂SO₄/hour. Gas from decomposer is 35% SO₃ or 2,708 and balance or 65/35×2,708 or 5,028 is SO₂ recirculated and total SO₂ and SO₃ is 7,736 lbs./hour.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A process for the dehydration and decomposition of metallic sulfates which decompose into corresponding metallic oxides and sulfur oxide gases comprising:
  (a) passing the metallic sulfate through a plurality of serially arranged dehydration stages of increasing temperature to drive contained water therefrom by countercurrently contacting said sulfate in finely-divided form with a heated gas, and producing thereby heated anhydrous metallic sulfate and a water-vapor bearing gas;
  (b) recycling the hot water-vapor bearing gas from each succeeding dehydration stage to a preceding dehydration stage of lower temperature;
  (c) separating said metallic sulfate from said gas;
  (d) raising the temperature of the heated sulfate at least to its decomposition temperature by contacting the same in direct heat-exchange relation with a quantity of the corresponding metallic oxide heated to a temperature above the decomposition temperature of said sulfate, and producing thereby mixed sulfur oxide gases and a metallic oxide;
  (e) separating said metallic oxide from said mixed sulfur oxide gases;
  (f) recovering sulfur trioxide contained in said mixed sulfur oxide gases produced in step (d) as sulfuric acid, and recycling sulfur dioxide contained therein to step (d);
  (g) calcining said oxide by combustion heating to produce heated combustion gases and metallic oxide at a temperature above the decomposition temperature of said sulfate;
  (h) recycling said heated gases for dehydration of said metallic sulfate in step (a);
  (i) recycling a portion of said heated metallic oxide to step (d); and
  (j) recovering the remainder of said heated oxide as a decomposition product.

2. The process as claimed in claim 1, and further comprising cooling the heated oxide recovered in step (j) by contacting the same with cool air, effecting thereby the heating of said air, and utilizing said heated air for combustion heating in step (g).

3. The process as claimed in claim 1, wherein the heat content of said mixed sulfur oxide gases is recovered prior to recovering said sulfur trioxide as sulfuric acid, said heat being utilized to preheat said sulfur dioxide prior to recycling the same to step (d).

4. Process for the decomposition of metallic sulfates which decompose into corresponding metallic oxides and sulfur oxide gases comprising:
  (a) raising the temperature of the sulfate at least to its decomposition temperature by contacting the same in direct heat-exchange relation with a quantity of the corresponding metallic oxide heated to a temperature above the decomposition temperature of said sulfate, and producing thereby mixed sulfur oxide gases and a metallic oxide;
  (b) separating said oxide from said gases;
  (c) calcining said oxide by combustion heating to produce heated combustion gases and a calcined oxide at a temperature above the decomposition temperature of said sulfate;
  (d) recycling a portion of said calcined oxide for heat exchange in step (a);
  (e) recovering the remainder of said calcined oxide as a decomposition product;
  (f) cooling the heated oxide recovered in step (e) by contact with air and utilizing the heated air for combustion in step (c);
  (g) recovering the heat content of said mixed gases from step (b);
  (h) recovering sulfur trioxide contained in the mixed sulfur oxide gases from step (b) as sulfuric acid and recycling sulfur dioxide contained therein to step (a).

References Cited by the Examiner

UNITED STATES PATENTS

| | | | |
|---|---|---|---|
| 1,752,599 | 4/1930 | Kjellgren | 23—142 X |
| 2,376,564 | 5/1945 | Uphani et al. | |
| 2,422,501 | 6/1947 | Roetheli | 23—262 |
| 2,582,246 | 1/1952 | Garbo | 23—1 |
| 2,663,620 | 12/1953 | Haensel | 23—142 |
| 2,773,741 | 12/1956 | Autonsen | 23—142 |
| 2,801,901 | 8/1957 | Dingman et al. | 23—142 |
| 2,830,892 | 4/1958 | Udy | 23—142 X |
| 2,909,409 | 10/1959 | Gregory | 23—202 |
| 3,007,774 | 11/1961 | Stokes et al. | 23—143 |
| 3,100,693 | 8/1963 | Klein et al. | 23—262 |

OSCAR R. VERTIZ, *Primary Examiner.*

BENJAMIN HENKIN, MAURICE A. BRINDISI,
*Examiners.*

H. T. CARTER, *Assistant Examiner.*